US008539899B2

(12) United States Patent  
Gimpel et al.

(10) Patent No.: US 8,539,899 B2
(45) Date of Patent: Sep. 24, 2013

(54) MULTIFUNCTIONAL RECREATIONAL VEHICLE (75) Inventors: Brian Mervin Gimpel, Mutdapilly (AU); Mark Evans, Mutdapilly (AU)

(73) Assignee: Getaway Concepts Pty Ltd, Mutdapilly, QLD (AU)

( * ) Notice: Subject to any disclaimer, the term of this patent is extended or adjusted under 35 U.S.C. 154(b) by 20 days.

(21) Appl. No.: 13/001,408

(22) PCT Filed: Jun. 23, 2009

(86) PCT No.: PCT/AU2009/000805
§ 371 (c)(1),
(2), (4) Date: Mar. 4, 2011

(87) PCT Pub. No.: WO2009/155644
PCT Pub. Date: Dec. 30, 2009

(65) Prior Publication Data
US 2011/0247538 A1 Oct. 13, 2011

(30) Foreign Application Priority Data

Jun. 23, 2008 (AU) ................................ 2008903178

(51) Int. Cl.
*B63B 21/64* (2006.01)
(52) U.S. Cl.
USPC ........................................ 114/344; 114/61.18
(58) Field of Classification Search
USPC .................... 114/344, 61.15, 61.18
See application file for complete search history.

(56) References Cited

U.S. PATENT DOCUMENTS

| 2,850,747 | A | * | 9/1958 | Bouchard, Sr. ................ 114/344 |
| 4,040,134 | A | | 8/1977 | Downing |
| 4,048,685 | A | | 9/1977 | Gail |
| 4,188,056 | A | | 2/1980 | Watson |
| 4,869,194 | A | | 9/1989 | Cummins |
| 5,072,963 | A | | 12/1991 | De Basto |
| 5,505,514 | A | | 4/1996 | Green |
| 6,067,925 | A | | 5/2000 | Little |
| 6,079,729 | A | * | 6/2000 | Braun ........................ 280/414.1 |
| 6,145,465 | A | | 11/2000 | Murphree |
| 6,164,238 | A | | 12/2000 | Stokes |
| 6,257,167 | B1 | * | 7/2001 | Joaquim ....................... 114/344 |
| 6,293,220 | B1 | | 9/2001 | Halsall |
| 6,298,802 | B1 | | 10/2001 | Brignolio |
| 6,439,145 | B1 | * | 8/2002 | Mensch ..................... 114/61.18 |
| 6,446,569 | B1 | | 9/2002 | Pitts |
| 6,568,344 | B2 | | 5/2003 | Burlet |
| 6,647,913 | B2 | | 11/2003 | Brignolio |
| 6,663,130 | B1 | | 12/2003 | Dray |
| 6,725,796 | B2 | | 4/2004 | Mensch |
| 2009/0078189 | A1 | * | 3/2009 | Kazmierowicz ............ 114/77 R |

* cited by examiner

*Primary Examiner* — Stephen Avila
(74) *Attorney, Agent, or Firm* — Stoneman Law Patent Group; Martin L. Stoneman (57) ABSTRACT

A vessel having an elongate base frame with a transverse tubular member adjacent each end of said base frame. The vessel also has elongate buoyancy members extending substantially parallel to a longitudinal axis of the base frame adjacent opposite sides thereof. The elongate buoyancy members are movable between respective extended and retracted positions relative to the base frame by support beams telescopically located within respective ends of a respective tubular member. The vessel also has a drive system to selectively move the elongate buoyancy members between the extended and retracted positions. The vessel also has a mobile transportation unit. The transportation unit includes an elevation mechanism to move the vessel between a raised position with retracted buoyancy members for road transportation and a lowered position with extended buoyancy members. The mobile transportation unit is detachable from the vessel when in the lowered position.

18 Claims, 6 Drawing Sheets

MULTIFUNCTIONAL RECREATIONAL VEHICLE

FIELD OF THE INVENTION

This invention is concerned with a trailerable amphibious vehicle.

The invention is concerned particularly, although not exclusively, with a combination of a multi-hulled vessel with outer hulls selectively movable between an extended and a retracted position and a trailer therefor, said trailer being adapted for selective elevation of said vessel thereupon.

BACKGROUND OF THE INVENTION

In many developed countries an increasingly affluent society is able to pursue recreational activities such as touring, camping, boating and the like with purpose designed mobile vehicles or trailer-borne units towable behind a motor vehicle. Motor homes, trailer homes, camper trailers and trailerable boats all provide a wider range of choices of recreational venues than a permanent holiday residence, fixed vessel mooring or the like.

While providing a user with a greater geographical freedom, mobile or trailer-borne recreational units tend to be purpose designed for a specialized sole function or otherwise represent a poor compromise between differing functionalities. For those persons who wish to enjoy boating and comfortable accommodation at a remote location, this often necessitates the expense and inconvenience of having to tow multiple units with separate tow vehicles or otherwise to utilize, say, a large motor home to tow a large boat/trailer combination which can be quite daunting for inexperienced drivers.

For several decades, various proposals have been made for amphibious vehicles which can be used as a water-borne vessel offering various levels of accommodation/shelter while offering the same accommodation/shelter on land.

U.S. Pat. No. 4,869,194 discloses an amphibious accommodation unit transportable on a flat bed trailer wherein the unit includes a main accommodation unit incorporating a main hull and a second hull pivotally mounted to the main unit to form a hull extension in an extended state.

U.S. Pat. No. 6,663,130 discloses a pontoon boat/trailer combination wherein the trailer wheels are located between the fixed pontoons of the pontoon boat.

U.S. Pat. No. 5,072,963 discloses a combined trailer home and boat assembly wherein the trailer includes a superstructure surrounding the front and side portions of the boat when supported on the trailer to present the appearance of a unitary, aerodynamically designed structure when used as a trailer home.

U.S. Pat. No. 6,164,238 describes a dual hulled boat with a frame connecting the spaced hulls. A hinged connection in the frame allows the hulls to be locked in an open extended state or in a folded state wherein one hull is located above the other hull in an inverted state to form an enclosure for storage or accommodation.

While generally satisfactory for their respective intended uses, the abovementioned boat/trailer combinations have a maximum permissible width for road use without a special transport license. In Australia, that width is 2500 mm. As a consequence, the limited beam of the vessel can cause stability problems on water or, in the case of the trailer described in U.S. Pat. No. 6,663,130, the narrow track of the trailer wheels could contribute to instability on the road.

Attempts to combine a marine vessel with a separate storage or accommodation unit often give rise to compromises in functionality and/or ease of use.

For example, U.S. Pat. No. 6,293,220 describes a vehicle trailer having a moulded plastics body with a removable moulded plastics cover in the form of an inverted dinghy while U.S. Pat. No. 5,505,514 discloses an elongate trailer frame with a gooseneck trailer hitch, the front portion of the trailer frame supporting a fixed accommodation enclosure while the rear end is adapted to support a boat or motor vehicle. U.S. Pat. No. 4,188,056 describes a trailer frame adapted to support a boat such as a runabout with a retractable roof camper body mounted over the boat. When the boat is removed from the trailer, the camper body may be lowered onto the trailer bed for use as a camper trailer.

It is also known to adapt the structure of a marine vessel to allow the vessel itself to form a trailer frame with retractable and/or releasable ground wheels and a trailer hitch. U.S. Pat. No. 6,568,344 describes a boat/trailer assembly wherein the boat is fitted with at least one longitudinal strut and at least one transverse strut to which may be removably mounted a trailer hitch assembly and spaced road wheel assemblies respectively. Similarly, U.S. Pat. No. 6,446,569 describes a boat hull having wheel mount legs pivotally connected on opposite upper sides thereof for movement through 270° from a retracted stored position in respective hatches to an extended locked position with the wheels engaging a ground surface. An extendable tow bar with a trailer hitch is telescopically mounted to a central region of the boat.

U.S. Pat. No. 6,145,465 describes a combination foldable camper/boat trailer/trailer system wherein a pair of shells are hingedly connected in a clam shell configuration to form a boat hull when fully extended with a collapsible tent structure spanning the two shells. Extendible supports associated with the trailer support the shells in an open extended position.

U.S. Pat. Nos. 4,040,134 and 6,067,925 each describe collapsible pontoon boat assemblies with retractable ground-engaging wheels which permit the vessel to function as an integrally formed trailerable unit when in a collapsed state.

U.S. Pat. No. 4,048,685 describes a trailerable houseboat comprising a travel trailer module and a pair of buoyant pontoons pivotally mounted thereto for movement between a retracted road travel position on the roof of the trailer module and an extended position along opposite lower sides of the module. In a launch position, the road wheels of the trailer module extend below the pontoons to allow the unit to roll on its wheels and when afloat, the travel trailer module is elevated with respect to the pontoons to raise the road wheels up out of the water.

U.S. Pat. Nos. 6,298,802, 6,647,913 and 7,171,915 each address the conflict between vessel stability when buoyant and width limitations for trailer transport by providing collapsible pontoon boats. U.S. Pat. Nos. 6,298,802 and 6,647,913 describe collapsible deck structures which permit pontoons to be moved laterally between an extended position for use on water and a retracted position for road transportation. Both of these patents also describe trailers with transversely movable pontoon supports to facilitate movement of the pontoons between extended and retracted positions on the trailer. U.S. Pat. No. 7,171,915 describes a pontoon boat with inflatable pontoon envelopes collapsible to reduce transverse width of the vessel for road transportation while an extendable deck section is retractable to reduce transportation length.

While each of the aforementioned amphibious recreational units are, to a greater or lesser extend, generally satisfactory for their respective intended purposes, each suffers from one or more deficiencies such as complexity, cost, requirement for a large horsepower towing vehicle, stability under towing or afloat, lack of convenience for use as an accommodation unit, inadequate performance as a marine vessel and the like.

Accordingly, it is an aim of the present invention to provide a multifunctional recreational vehicle which overcomes or ameliorates at least some of the deficiencies of the prior art and/or otherwise to provide consumers with a greater choice.

SUMMARY OF THE INVENTION

According to one aspect of the invention there is provided a multifunctional recreational vehicle system comprising:

a vessel having an elongate base frame with a transverse tubular member adjacent each end of said base frame;

elongate buoyancy members extending substantially parallel to a longitudinal axis of said base frame adjacent opposite sides thereof, said elongate buoyancy members being movable between respective extended and retracted positions relative to said base frame by support beams telescopically located within respective ends of a respective said tubular member;

a drive system to selectively move said elongate buoyancy members between said extended and retracted positions; and, a mobile transportation unit for said vessel, said transportation unit including an elevation mechanism to move said vessel between a raised position with retracted buoyancy members for road transportation and a lowered position with extended buoyancy members wherein, said mobile transportation unit is detachable from the vessel when the vessel is in the lowered position.

Suitably, said base frame comprises two or more elongate members coupled to a plurality of transverse members.

If required, said base frame may include upper and lower cladding members to form a hollow chamber therebetween.

The elongate buoyancy members may include closed buoyancy chambers.

If required, the elongate buoyancy members may include storage compartments.

Suitably, said drive system comprises electrically powered linear actuators.

Preferably, said electrically powered linear actuators have electrically coupled control systems for synchronized movement of said buoyancy members between extended and retracted positions.

The mobile transportation unit may comprise a powered road vehicle.

Alternatively, the mobile transportation unit may comprise a wheeled road trailer.

Preferably, the elevation mechanism of said mobile transportation unit comprises spaced extendable arms releasably engageable with said base frame.

If required, said extendable arms may support a cradle structure releasably engageable with said base frame.

Suitably, said base frame supports a deck structure.

If required, said deck structure may include an enclosed cabin structure.

Preferably, said cabin structure includes a retractable roof structure.

Throughout the specification, unless the context requires otherwise, the word "comprise", and variations such as "comprises" or "comprising", will be understood to imply the inclusion of a stated integer or group of integers or steps but not the exclusion of any other integer or group of integers.

BRIEF DESCRIPTION OF THE DRAWINGS

In order that the invention may be fully understood and put into practical effect, reference will now be made to preferred embodiments disclosed herein and/or illustrated in the accompanying drawings in which:—

in an extended lowered state for use as a camper trailer or for launching the vessel.

DETAILED DESCRIPTION OF THE DRAWINGS

For the sake of simplicity, like reference numerals have been employed where appropriate for like features in the drawings.

Figure 1:
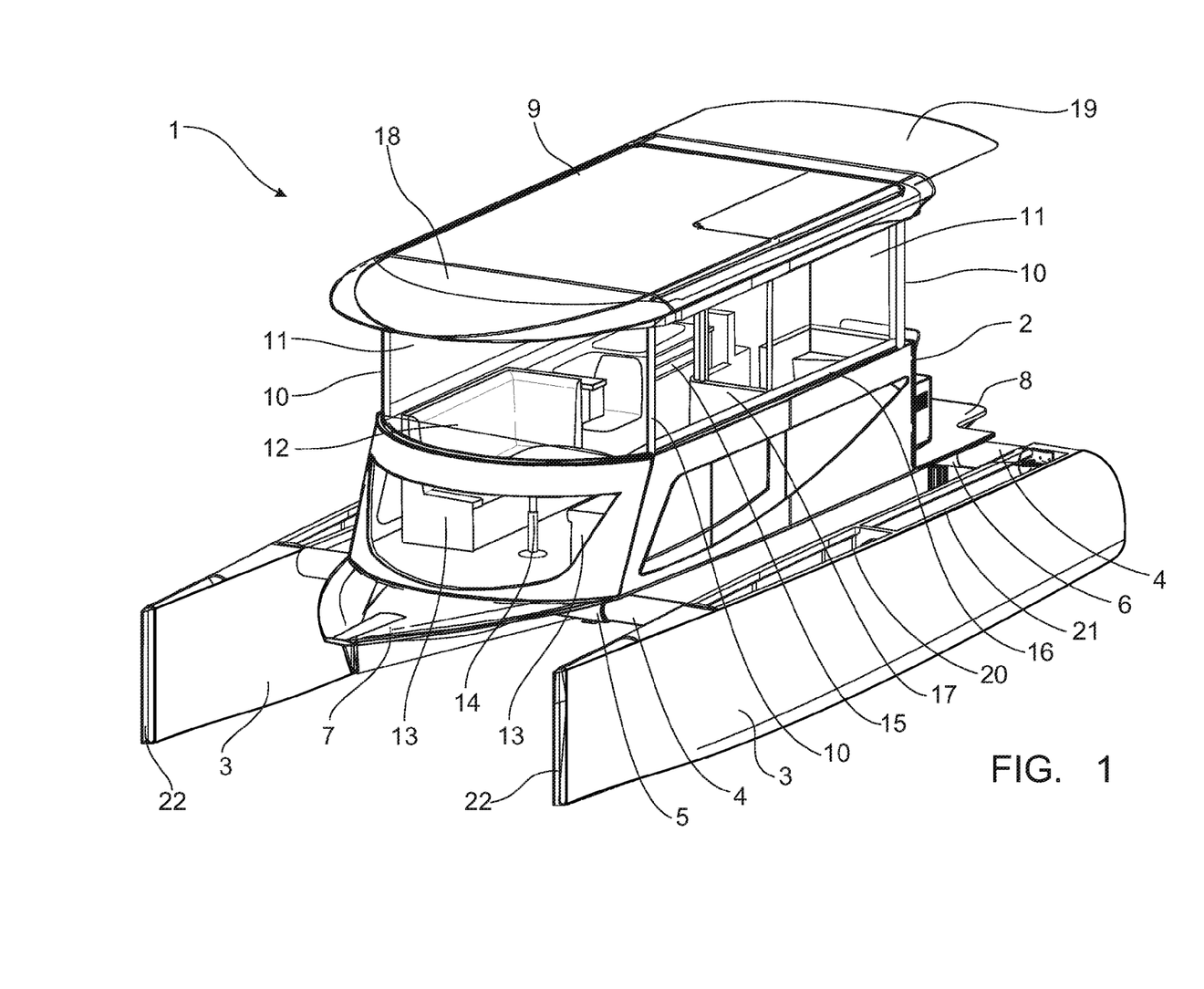
FIG. 1 shows schematically a marine vessel according to one aspect of the invention.

In FIG. 1 there is shown a schematic view of the vessel component 1 of the invention with the upper and lower front windows and the upper port window omitted to provide a view of the interior of the accommodation cabin 2. The vessel comprises a base frame (not shown) which supports accommodation cabin 2 and otherwise supports a pair of buoyancy hulls 3 mounted for movement between an extended position shown and a retracted position (not shown) by telescopic movement of cylindrical hull support beams 4 within front and rear transverse tubular frame members 5,6 respectively. Suspended from the front of the base frame is a foredeck formation 7 and extending rearwardly from cabin 2 in a rear deck 8 also supported on the base frame.

Cabin 2 is conveniently constructed in a manner similar to a "pop-top" camper trailer with a roof structure 9 supported on posts 10 retractable into a rigid lower cabin structure 2a. The windows 11 of the retractable roof structure 9 all may be rigid acrylic sheeting, flexible transparent plastics sheeting or a combination thereof. The layout of the cabin structure may be of any suitable design but as illustrated, it includes a forward relaxation area 12 with opposed banquette-type seats 13 and a table 14 therebetween. The port side of the cabin structure 2 may have a galley area 15 towards the rear of the cabin, while the starboard rear section may include a bathroom 16 having shower, handbasin and toilet facilities. An alleyway 17 between the galley and bathroom structures 15,16 respectively leads to a doorway (not shown) in the rear wall of the cabin structure. Main cabin roof 18 may have a selectively extendable rear portion 19 to provide shelter over rear deck portion 8.

Hulls 3 suitably have storage compartments 20,21 extending to about half the depth of each hull and are accessible by hatches (not shown) along the top of each hull which when closed, form partial side decks. Extending between the base frame and the inner sides of each hull are flexible deck sections of fabric or mesh (also not shown). Beneath the storage compartments and in the front portion of each hull are sealed buoyancy compartments, preferably filled with a cloned cell plastics foam. The front of each hull 3 includes a removable resilient bow strip 22.

As illustrated in FIG. 1, the embodiment shown is conveniently formed with fibreglass hulls 3, lower cabin portion 2a, roof 18 and internal furniture, however, any suitable materials may be employed for these items.

It should be understood that the vessel component of the invention is not limited to the embodiment shown as it may have a simple flat deck similar to a pontoon-style boat or it may have a flat deck with a simple safety rail, a roof and seating along the lines of an entertainment vessel sometimes referred to as a "barbeque pontoon". The basic structure and functionality of the vessel according to the invention comprises a central base frame for supporting on each side thereof selectably extendable or retractable hulls and any required superstructure may be supported thereon.

Figure 2:
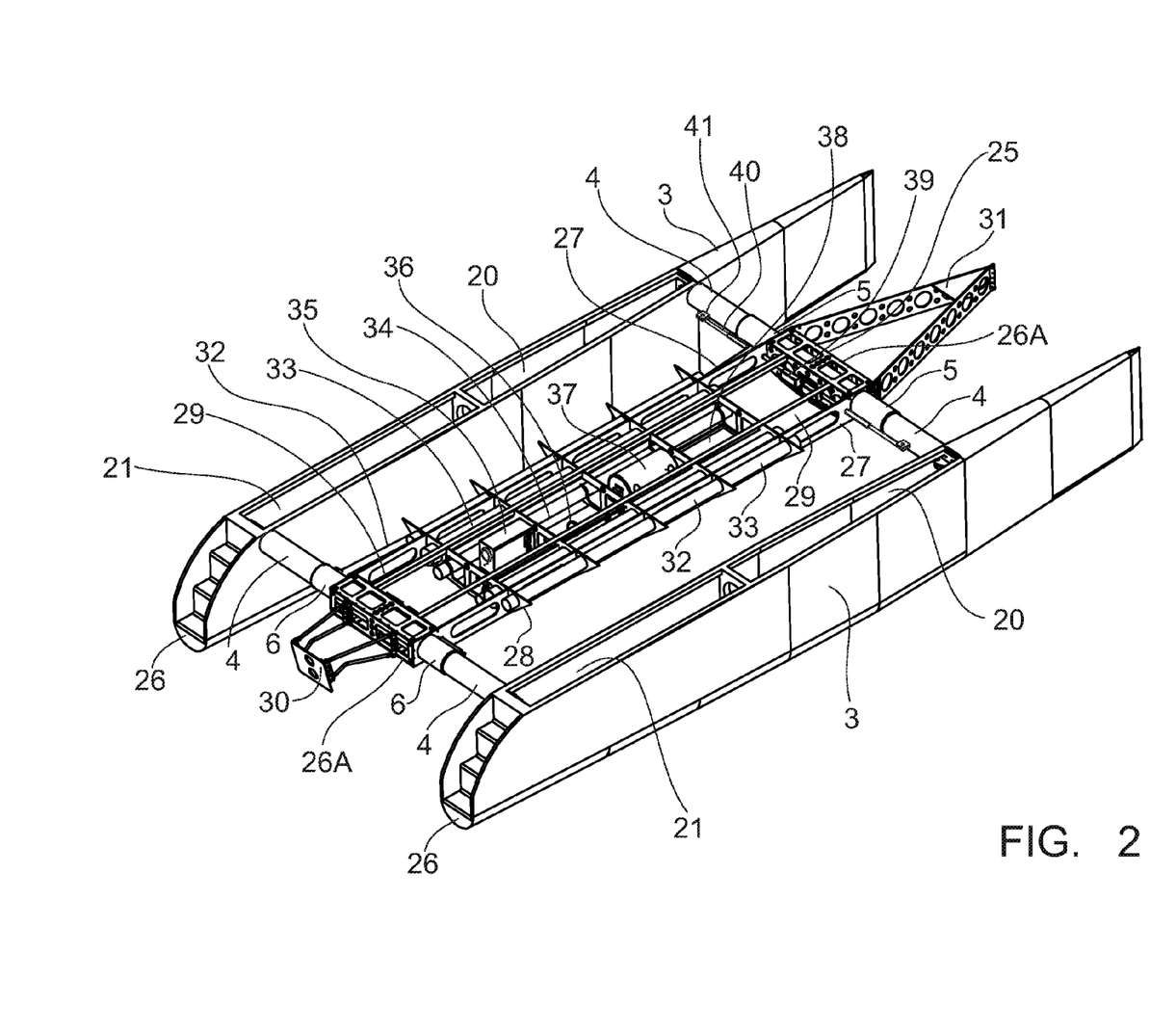
FIG. 2 shows schematically an exposed view of the vessel of FIG. 1 without the superstructure.

FIG. 2 shows schematically the basic vessel component of the invention in the form of a base frame structure 25 supporting tubular frame members 5,6 within which cylindrical hull support beams 4 are telescopically movable. In the embodiment show, storage compartments 20,21 in hulls 3 are visible as are access stairs 26 integrally formed in each hull 3. For the sake of simplicity, access hatches for storage compartments 20,21 are omitted.

Frame 25 comprises rigid fabricated box-like structures 26 surrounding and secured to tubular frame members 5,6. Extending longitudinally between box-like structures 26A are spaced longitudinal bearers 27 coupled to transversely extending bulkheads 28 to form a truss-like structure exhibiting great torsional strength. Suitably, the elements of box-like structures 26A are rigidly bolted together and longitudinal bearers 27 are bolted to box-like structures 26A. Transverse bulkheads are coupled to longitudinal bearers 27 and longitudinal stringers 29 interlocking slot formations secured by a stiff but resilient adhesive compound such as a curable polyurethane material to form a stiff structure with limited flex capability to avoid stress cracking which would otherwise occur in a welded metal structure. Frame 25 is preferably comprised of marine grade aluminium plate components. Mounted on the rear end of frame 25 is an outboard motor bracket 30 and a foredeck support frame 31 extends from the front of frame 25.

Located within the spaced between bulkheads 28 are various conduits such as grey water waste conduits 32, fresh water conduits 33 and black water waste conduit 34. Located within the central regions between adjacent bulkheads are a waste treatment unit 35, pump units 36, a water heating unit 37 and a batter box 38. Base frame 25 includes a moulded contoured fibreglass under tray (not shown) and a flat cored composite fibreglass top (also not shown), the under tray and top being fastened to the base frame and to each other about peripheral edges thereof to further stiffen the base frame structure. Access hatches (not shown) are formed in the composite top member for access to functional components in respective compartments within base frame 25.

Mounted on the inner faces of box-like structures 26 are electrically powered linear actuators each comprising an actuator drive 39 and a telescopic actuator shaft 40 a free end of which is coupled via a bracket 41 to cylindrical hull support beams 4.

Figure 3:
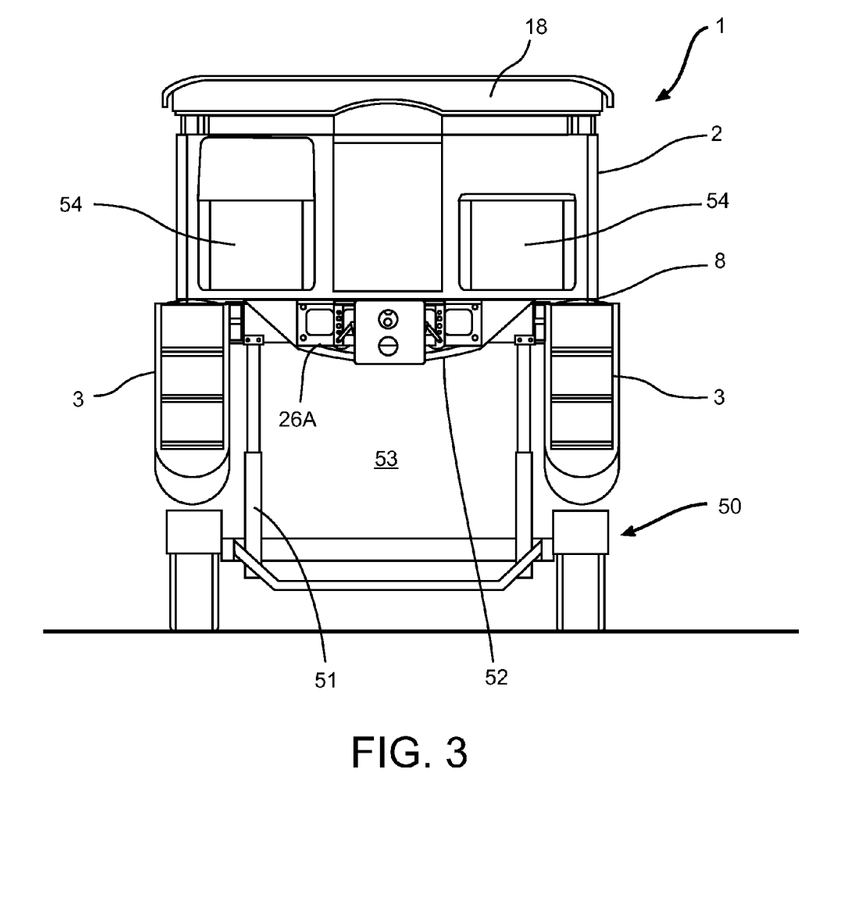
FIG. 3 shows a part-sectional rear elevation of the multifunctional recreational system according to the invention in a retracted elevated state for road transportation.

FIG. 3 is a rear elevational view of the vessel/transportation unit system according to the invention.

Vessel 1, with its raisable roof 18 in a lowered position as shown and with the hulls 3 in a retracted state, is supported on a road trailer 50 for road transport. Hydraulic rams 51 having semi-circular cup-shaped brackets (not shown) at respective free ends thereof support each of tubular frame members 5,6 adjacent respective ends thereof while vessel 1 is in a transport position shown. Alternatively, rams 51 may support a contoured cradle structure (not shown) having a dished recess with a shape complementary to that of the contoured lower skin 52 of base frame structure 25. As shown, the vessel, in its fully retracted state, is sufficiently narrow to comply with maximum transport width requirements but otherwise is sufficiently compact for stability during transportation with streamlined hull and superstructure contours providing less wind drag than a conventional caravan with greater fuel efficiency for the tow vehicle. The space 53 between the hulls 3 may be utilized to stow other items such as a dinghy tender during transportation. Insulated storage boxes 54 may be conveniently mounted on the rear deck 8.

Figure 4:
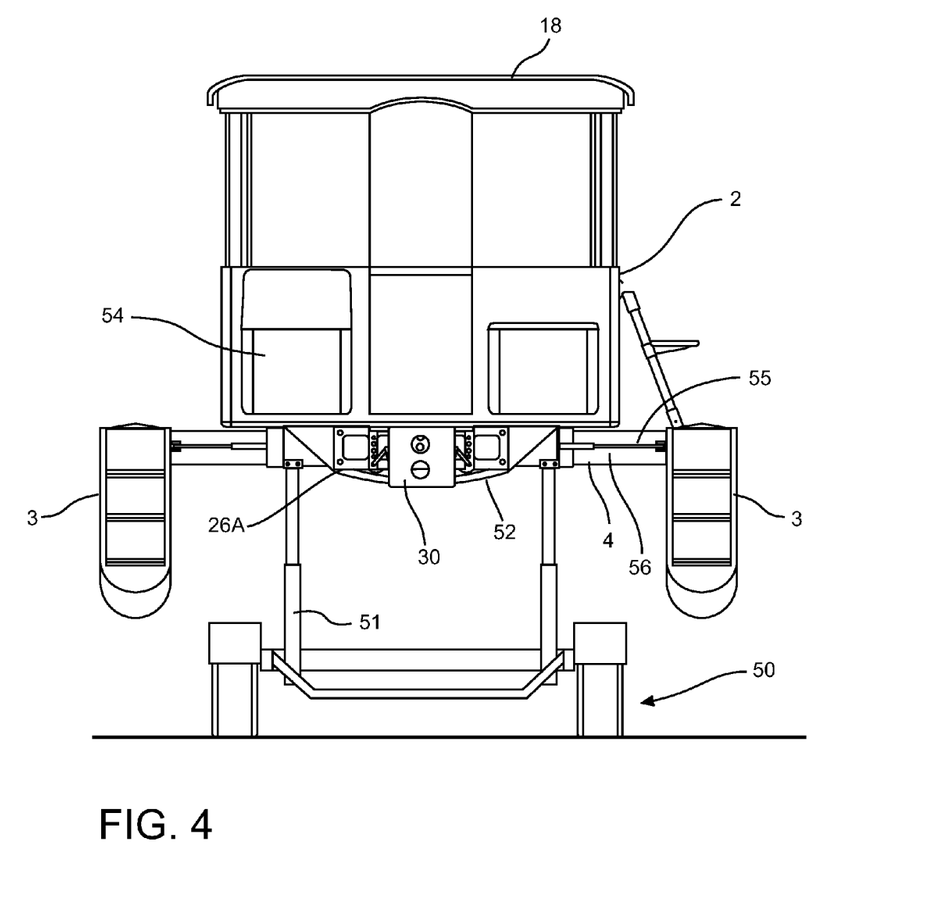
FIG. 4 shows the system of FIG. 3 in an extended elevated state.

FIG. 4 is a part-sectional rear elevational view showing vessel 1 in an elevated position on transportation unit 50 with hulls 3 in an extended state.

As a precursor to launching vessel 1 or otherwise utilizing it as an accommodation unit in a trailer park or the like, vessel 1 is first elevated from a transport position shown in FIG. 3 to a position where the linear actuators 39 (shown in FIG. 2) may be actuated to extend hulls 3 at least to a position beyond the side extremities of transportation unit 50. Hydraulic rams 51 are powered by an electric pump (not shown) coupled via a fluid reservoir (not shown) to spool valves (not shown) for selective raising or lowering of vessel 1. Electric power maybe provided by the towing vehicle (not shown) or the vessel 1 or alternatively, batteries on a small electric generator may be mounted on the trailer.

Retractable roof structure 18 may be manually erected with the assistance of gas struts (not shown) or like mechanical assistance such as a cable winch rack and pinion mechanism (not shown), hydraulic cylinders (not shown) or preferably four electrically powered linear actuators, one adjacent each corner supported by cross braced walls when erected.

Hull support beams 4 are reinforced by slotted interlocking aluminium plates 55 pressed into the interior of the cylindrical beams to form a cruciform cross-section reinforcing member 56.

Figure 5:
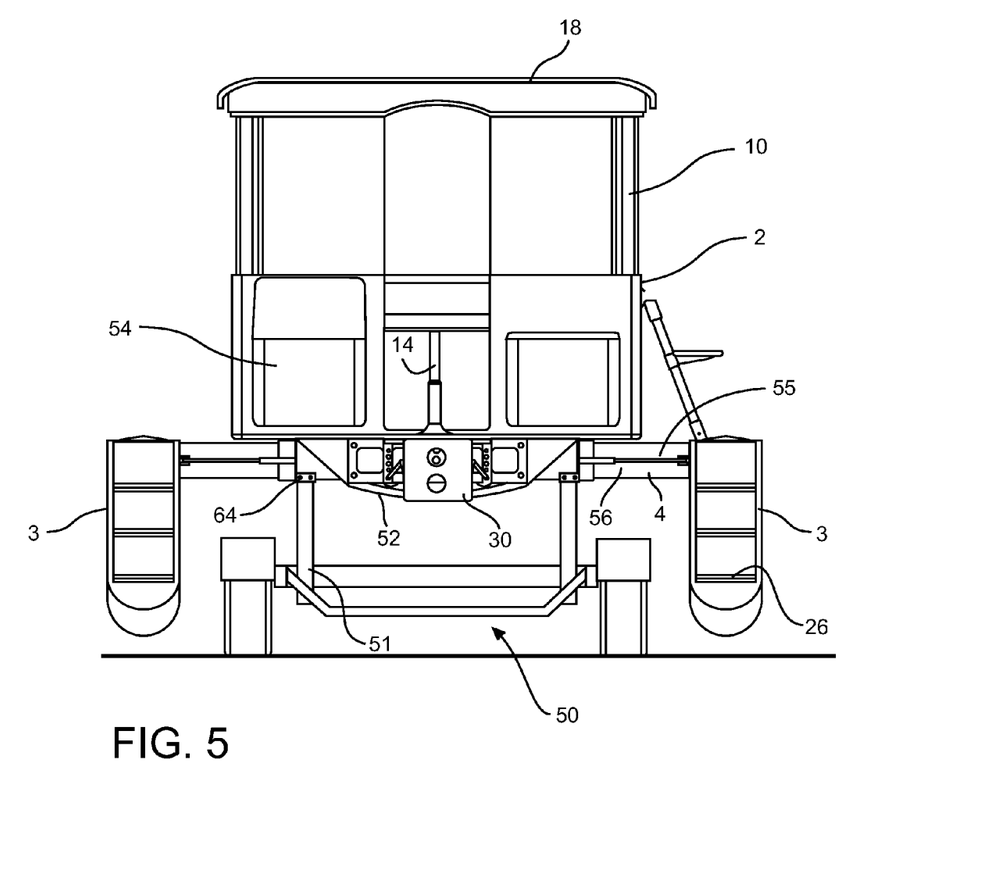
FIG. 5 is a rear elevational view of the system of FIGS. 3 and 4.

FIG. 5 shows a part-sectional rear elevation view of the system in a lowered state with hulls 3 extended.

In the position shown, access to cabin 2 may be obtained via access stairs 26 at the aft end of each hull 3. With the elevation mechanism in a lowered state, and with roof 18 raised, the system conveniently may be utilized as a camper trailer whilst en route to a remote boating destination. Similarly, in the lowered position as shown with the hulls extended to a maximum width, the vessel 1 may be launched on a trailer ramp as there is sufficient clearance between the hulls and a ground surface to permit maneuvering the trailer-borne vessel yet the vessel still may be launched with only limited immersion of the trailer.

Figure 6:
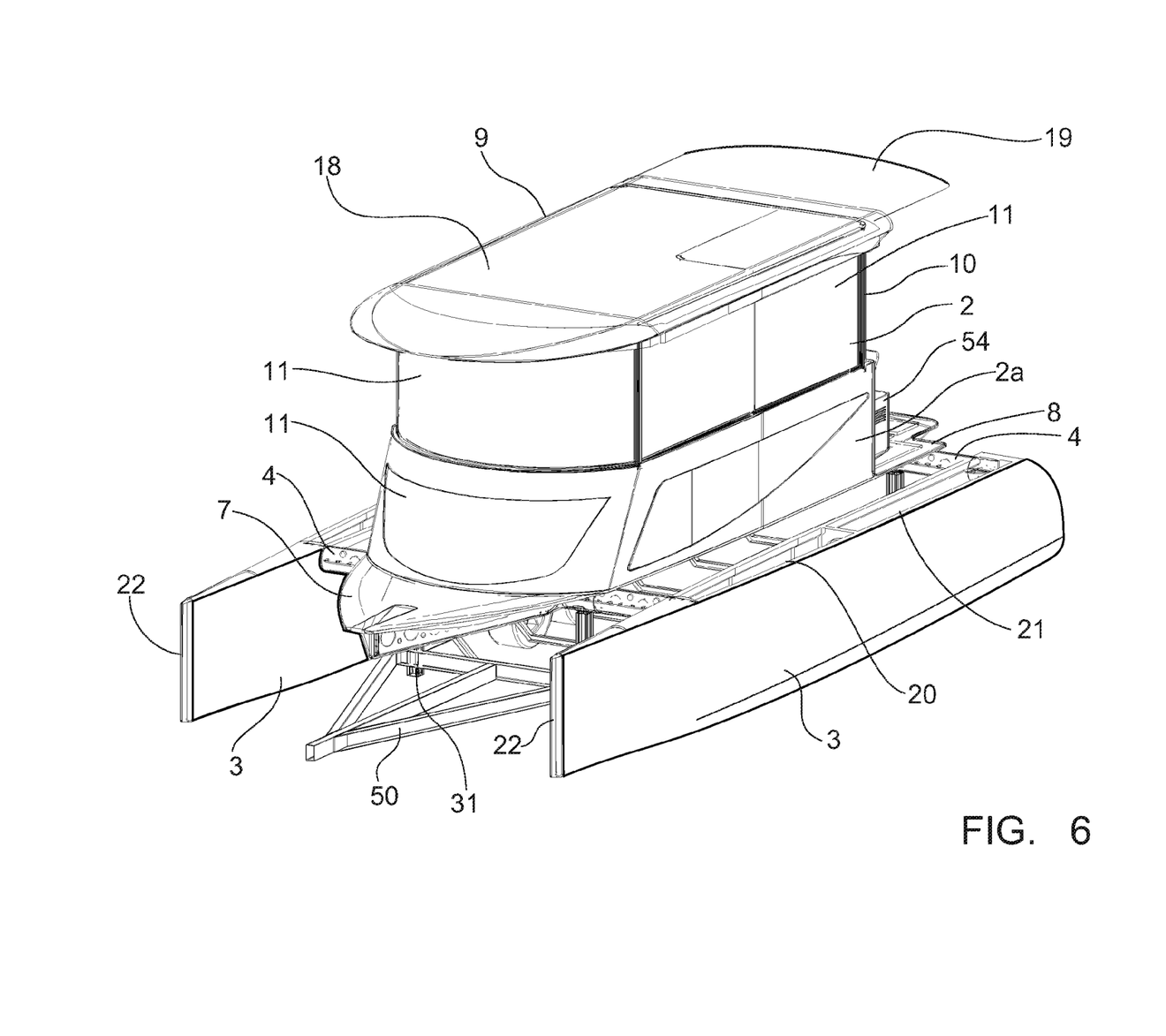
FIG. 6 shows a side perspective view of the system configured in FIG. 5.

FIG. 6 shows a part-sectional side perspective view of the system of FIG. 5 with hulls 3 and cabin 2 extended and with the full elevation mechanism lowered ready for launching into a waterway or otherwise for use as a camper trailer on land. Like FIGS. 1 to 5, decking over hulls 3 and safety rails and supporting stanchions are omitted for the sake of clarity.

In this position, the spaced extendable arms in the form of rams 51 are releasably engageable with base frame structure 25 in order to allow vessel 1 to be detachable from transportation unit 50 to facilitate the launch.

On the water, the sleek narrow hulls provide ample buoyancy, but unlike pontoon boats with generally cylindrical pontoons, allow maximum hull speed with minimal motive power. For example, an eight metre vessel having a four metre beam is considered easily navigable against high head winds and/or water currents with an outboard motor of about 15 H.P. With a 50 H.P. outboard motor, it is considered that the vessel would be able to tow at least one water skier at speeds up to 20 km/hour.

In sheltered waterways or marine parks where conventional fossil fuel powered motors are prohibited, the vessel may be adapted to receive electrically powered thruster motors powered by batteries located in the hulls, the batteries being recharged by solar panels on the roof of the vessel. Again, because of the reduced hydrodynamic drag of the narrow hulls, relatively low powered electric thruster devices may be employed to reduce power consumption without sacrificing too much in the way of vessel speed.

It readily will be apparent to a person skilled in the art that many modifications and variations may be made to the various aspects of the invention without departing from the spirit and scope thereof.

For example, the vessel may include fixed stanchions and safety rails on the outer upper edges of hulls 3 so that when hulls 3 are retracted, the safety railing structures do not foul against cabin structure 2. Similarly, pulpit and pushpin structures may be mounted on foredeck 7 and aft deck 8 respectively with flexible safety lines which tauten as hulls 3 move to an extended state. Alternatively, hulls 3 and roof 18 may be provided with toe rails along the outer upper hull edge, the toe rails including socket apertures to receive removable stanchions therein.

Importantly, the combination of vessel and transportation unit permits compliance with road regulations whilst permitting a very stable marine craft which, if required, can double as a camper trailer either on the water or on the land. The vessel is easily configured as a simple pontoon boat-like floating platform through a wide range of functional purposes to a luxury water-borne vessel.

In other embodiments, the upper regions of hulls 3 may have a width such that with hatches (not shown) in a closed state, flexible or other deck sections extending between the lower side of cabin 2 and an inner upper edge 3a (shown in FIG. 6) are not necessitated. To improve hull stability, items such as batteries, fuel and water tanks and the like may be located within hulls 3 thereby lowering the centre of gravity of the vessel and reducing load stresses on the base frame structure. Roof structure 18 may be reinforced to provide a further deck area in which case a toe rail (not shown) is provided adjacent the outer edges of the roof 18 with removable stanchions (not shown) locatable in sockets in the toe rail.

Similarly, transverse bulkheads 28 (shown in FIG. 2) extend the full width of the cabin area for extra rigidity and instead of a centrally mounted single long leg outboard motor, separate smaller outboard motors may be mounted in respective wells formed adjacent the rear end of hulls 3. This permits the area of rear deck 8 to be extended with a lowerable access stair and/or duckboard structure.

What is claimed is:

1. A multifunctional recreational vehicle system comprising:
   a vessel having an elongate base frame with a transverse tubular member adjacent each end of said base frame;
   elongate buoyancy members extending substantially parallel to a longitudinal axis of said base frame adjacent opposite sides thereof, said elongate buoyancy members being movable between respective extended and retracted positions relative to said base frame by support beams telescopically located within respective ends of a respective said tubular member;
   a drive system to selectively move said elongate buoyancy members between said extended and retracted positions; and,
   a mobile transportation unit for said vessel, said transportation unit including an elevation mechanism to move said vessel between a raised position with retracted buoyancy members for road transportation and a lowered position with extended buoyancy members;
   a road transportation position structured and arranged to place said vessel in a position capable of road transportation, while on said road transportation unit;
   a launch position structured and arranged to place said vessel in a position capable of launching, while on said mobile transportation unit, into a body of water;
   wherein said launch position is lower than said road transportation position;
   wherein said mobile transportation unit is detachable from the vessel when the vessel is in the lowered position.

2. The multifunctional recreational vehicle system of claim 1 wherein said base frame comprises two or more elongate members coupled to a plurality of transverse members.

3. The multifunctional recreational vehicle system of claim 1 wherein said base frame includes upper and lower cladding members to form a hollow chamber therebetween.

4. The multifunctional recreational vehicle system of claim 1 wherein the elongate buoyancy members include closed buoyancy chambers.

5. The multifunctional recreational vehicle system of claim 1 wherein the elongate buoyancy members include storage compartments.

6. The multifunctional recreational vehicle system of claim 1 wherein, said drive system comprises electrically powered linear actuators.

7. The multifunctional recreational vehicle system of claim 6 wherein said electrically powered linear actuators have electrically coupled control systems for synchronized movement of said buoyancy members between extended and retracted positions.

8. The multifunctional recreational vehicle system of claim 1 wherein the mobile transportation unit comprises a powered road vehicle.

9. The multifunctional recreational vehicle system of claim 1 wherein the mobile transportation unit comprises a wheeled road trailer.

10. The multifunctional recreational vehicle system of claim 1 wherein the elevation mechanism of said mobile transportation unit comprises spaced extendable arms releasably engageable with said base frame.

11. The multifunctional recreational vehicle system of claim 10 wherein said extendable arms may support a cradle structure releasably engageable with said base frame.

12. The multifunctional recreational vehicle system of claim 1 wherein said base frame supports a deck structure.

13. The multifunctional recreational vehicle system of claim 1 wherein said deck structure may include an enclosed cabin structure.

14. The multifunctional recreational vehicle system of claim 1 wherein said cabin structure includes a retractable roof structure.

15. The multifunctional recreational vehicle system of claim 1 wherein said elevation mechanism comprises linear motion between such raised position and such lowered position.

16. The multifunctional recreational vehicle system of claim 1 wherein said buoyancy members comprises stairs structured and arranged to permit user access to said vessel.

17. The multifunctional recreational vehicle system of claim 13 wherein said cabin comprises an upper portion and a lower position.

18. The multifunctional recreational vehicle system of claim 17 wherein said upper portion is retractable into said lower position.

* * * * *